(12) United States Patent
Okazaki

(10) Patent No.: US 10,190,715 B2
(45) Date of Patent: Jan. 29, 2019

(54) FLUID PIPE DEVICE

(71) Applicant: NIFCO INC., Yokosuka-shi, Kanagawa (JP)

(72) Inventor: Tsuyoshi Okazaki, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/510,121

(22) PCT Filed: Aug. 25, 2015

(86) PCT No.: PCT/JP2015/073886
§ 371 (c)(1),
(2) Date: Mar. 9, 2017

(87) PCT Pub. No.: WO2016/039132
PCT Pub. Date: Mar. 17, 2016

(65) Prior Publication Data
US 2017/0254465 A1 Sep. 7, 2017

(30) Foreign Application Priority Data

Sep. 10, 2014 (JP) .................................. 2014-183758

(51) Int. Cl.
F16L 53/00 (2018.01)
F16L 53/34 (2018.01)
(Continued)

(52) U.S. Cl.
CPC ............. *F16L 53/34* (2018.01); *F01M 13/00* (2013.01); *F01M 13/04* (2013.01);
(Continued)

(58) Field of Classification Search
CPC ... H05B 3/06; H05B 3/30; H05B 3/24; H05B 2203/02; H05B 2203/022; F16L 53/30; F16L 53/34; F16L 53/00
(Continued)

(56) References Cited

U.S. PATENT DOCUMENTS 4,563,725 A * 1/1986 Kirby .................. H01L 23/4006
174/16.3
6,062,206 A 5/2000 Nelson et al.
(Continued)

FOREIGN PATENT DOCUMENTS

| CN | 102889155 A | 1/2013 |
|---|---|---|
| DE | 10326894 B3 | 9/2004 |

(Continued)

OTHER PUBLICATIONS

PCT/ISA/210, "International Search Report for International Application No. PCT/JP2015/073886," dated Sep. 29, 2015.
(Continued)

Primary Examiner — Tho V Duong
(74) Attorney, Agent, or Firm — Manabu Kanesaka

(57) ABSTRACT

A fluid pipe device is provided, which includes a pipe member forming a flow channel for flowing a fluid; a heating member for generating heat to heat the pipe member; a metal heat transfer member abutting against the heating member and conducting the heat to the pipe member; and a terminal member electrically connecting the heating member and the heat transfer member. The heat transfer member includes a first heat transfer member and a second heat transfer member, and at least one of the first heat transfer member and the second heat transfer member forms the terminal member at one portion, and the first heat transfer member is provided in the pipe member in such a way as not to be exposed inside the flow channel of the pipe member.

7 Claims, 13 Drawing Sheets

(51) Int. Cl.
    *F01M 13/00*     (2006.01)
    *F02M 35/10*     (2006.01)
    *H01C 7/02*     (2006.01)
    *H05B 3/14*     (2006.01)
    *F02M 31/135*     (2006.01)
    *F16L 55/027*     (2006.01)
    *F01M 13/04*     (2006.01)
    *H05B 3/06*     (2006.01)
    *H05B 3/28*     (2006.01)
    *H05B 3/42*     (2006.01)
    *H05B 3/44*     (2006.01)
    *F16L 53/35*     (2018.01)
    *F16L 53/37*     (2018.01)
    *F16L 53/30*     (2018.01)
    *F02M 31/02*     (2006.01)
    *F15D 1/00*     (2006.01)
    *H05B 3/20*     (2006.01)

(52) U.S. Cl.
    CPC .......... *F02M 31/135* (2013.01); *F02M 35/10* (2013.01); *F16L 53/35* (2018.01); *F16L 55/0279* (2013.01); *H01C 7/02* (2013.01); *H05B 3/06* (2013.01); *H05B 3/14* (2013.01); *H05B 3/286* (2013.01); *H05B 3/42* (2013.01); *H05B 3/44* (2013.01); *F01M 2013/0455* (2013.01); *F01M 2013/0472* (2013.01); *F02M 31/02* (2013.01); *F15D 1/001* (2013.01); *F16L 53/30* (2018.01); *F16L 53/37* (2018.01); *H05B 3/20* (2013.01); *H05B 2203/02* (2013.01); *H05B 2203/022* (2013.01); *Y02T 10/126* (2013.01)

(58) Field of Classification Search
    USPC ...................................... 219/408, 407, 424
    See application file for complete search history.

(56) References Cited

U.S. PATENT DOCUMENTS

| | | | |
|---|---|---|---|
| 6,881,933 B2 | 4/2005 | Wickel et al. | |
| 7,387,114 B2 * | 6/2008 | Gschwind | F01M 13/00 123/573 |
| 2006/0144376 A1 | 7/2006 | Gschwind et al. | |
| 2015/0139632 A1 * | 5/2015 | Mueller | F01M 13/00 392/480 |

FOREIGN PATENT DOCUMENTS

| | | | | |
|---|---|---|---|---|
| DE | 19846282 B4 * | 12/2006 | ........... | B29C 66/532 |
| DE | 10325965 B4 * | 1/2007 | ........... | F02M 31/135 |
| DE | 102012014746 A1 | 2/2014 | | |
| EP | 1375999 A1 * | 1/2004 | ............ | F01M 13/00 |
| JP | 2001-214995 A | 8/2001 | | |
| JP | 2014-173437 A | 9/2014 | | |

OTHER PUBLICATIONS

Europe Patent Office, "Search Report for European Patent Application No. 15839384.3," dated Feb. 2, 2018.

* cited by examiner

FLUID PIPE DEVICE

RELATED APPLICATIONS

The present application is National Phase of International Application No. PCT/JP2015/073886 filed Aug. 25, 2015, and claims priority from Japanese Application No. 2014-183758, filed Sep. 10, 2014, the disclosure of which is hereby incorporated by reference herein in its entirety.

FIELD OF TECHNOLOGY

The present invention relates to a fluid pipe device allowing a fluid such as a gas, liquid, or the like flowing in a passage inside a pipe to be warmed by a heating member.

BACKGROUND ART

For example, in a blow-by gas passage structure for circulating a blow-by gas (non-combusted gas) of an engine to the engine through an air intake passage, it is suitable for a case of warming the passage inside the pipe by the heating member additionally provided in a pipe so that the passage inside the pipe is not blocked by freezing of water in the blow-by gas. FIGS. 13(a) and 13(b) show a device of Patent Document 1 as one example thereof.

The device in the drawings is a type comprising a housing (corresponding to a pipe member in the present application) 26 forming a passage for flowing the fluid; a heating element (corresponding to the heating member in the present application) 16 generating heat for heating; a pipe segment (corresponding to a heat transfer member in the present application) 14 for abutting against the heating element 16 and conducting the heat to a passage side; and a pair of contact elements (corresponding to a terminal member in the present application) 20 electrically connecting to the heating element 16.

In those members, the heating element 16 and the contact elements 20 are fixed to the pipe segment 14 by a fixation element 22, and the fixation element 22, the heating element 16, and the pipe segment 14 are wrapped inside the plastic housing 26. Also, in the heating element 16, there is used a PTC element having a flat plate shape, and one electrode and the other electrode facing each other of the PTC element are connected the respective separate contact elements 20, and an electric power is supplied to both electrodes through the respective contact elements 20 from an electrical insertion connection device 18 so as to generate heat. The reference numeral 34 represents a gasket element for sealing, and the reference numerals 28 and 30 represent an urging spring maintaining a contact between the contact elements and the heating element.

PRIOR ART DOCUMENT

Patent Document

Patent Document 1: German Unexamined Patent Application Publication No. 102012014746

DISCLOSURE OF THE INVENTION

Problems to be Solved by the Invention

In the aforementioned structure, at least the housing, the heating element, the pipe segment, the two contact elements, and the fixation element are required, so that the number of components is large, and it is difficult to reduce a cost. Also, the pipe segment which is the heating member is exposed to one portion of a fluid passage and exposed to the fluid such as the blow-by gas and the like flowing through the passage to thereby be easily corroded. Moreover, in the structure, the gasket element is disposed inside the fixation element so as to reduce the fluid such as the blow-by gas and the like flowing through a flow channel leaking out of a minute gap between the members; however, it is impossible to completely eliminate a possibility of leakage.

An object of the present invention is to solve the aforementioned problems. Specifically, the device is formed with less number of members, and eliminates the possibility that the heating member corrodes due to the fluid flowing through the flow channel, or that the fluid leaks out of a gap between the members. Other objects of the present invention will be clarified in the following explanation of contents.

Means for Solving the Problems

In order to obtain the aforementioned objects, the present invention is a fluid pipe device comprising a pipe member forming a flow channel for flowing a fluid; a heating member generating heat to heat the pipe member; a metal heat transfer member abutting against the heating member and conducting the heat to the pipe member; and a terminal member electrically connecting the heating member and the heat transfer member (in other words, supplying an electric power to the heating member from a power source side). Also, the heat transfer member is formed by a first heat transfer member and a second heat transfer member, and at least one of the first heat transfer member and the second heat transfer member forms the terminal member at one portion, and the first heat transfer member is provided in the pipe member in such a way not to be exposed inside the flow channel of the pipe member.

In the aforementioned present invention, it is preferred to be formed as described in the following (A) to (E). Namely, (A) the first heat transfer member is integrated with the pipe member by insert molding. (B) The heating member is formed by a PTC (positive temperature coefficient) element having a flat plate shape, and in the first heat transfer member and/or the second heat transfer member, a portion abutting against an electrode of the PTC element is formed in a flat face portion. Incidentally, the PTC element is sometimes called a semiconductor or an electronic ceramic heater. (C) The PTC element is clamped by the first heat transfer member and the second heat transfer member, and is held in a state urged from the second heat transfer member side. (D) The first heat transfer member is formed to include a cylinder portion disposed in an axis line direction of the pipe member; the terminal member provided in a state wherein one portion of the cylinder portion is cut and raised; a horizontal slit provided in the cylinder portion and extending in the axis line direction; and a concave-convex portion or a wavelike portion provided in an edge portion of the horizontal slit (Aspect 5). (E) The second heat transfer member includes a substrate portion disposed in a positioning space (a gap and the like) provided in the pipe member; the terminal member formed to extend in the substrate portion; and an elastic claw provided in a state wherein one portion of the substrate portion is cut and raised, and capable of pressing the substrate portion to the PTC element side.

According to the preferred aspect described in the (A) above, the first heat transfer member is integrated with the pipe member by the insert molding so as to reduce the number of assemblies, and as a result, a production cost can be reduced. Additionally, the first heat transfer member can extend in an axial direction of the pipe member so as to efficiently warm a wide range of an inner face of the flow channel further.

According to the preferred aspect described in (B) above, in a case wherein the heating member is formed by the PTC element having the flat plate shape, when the PTC element contacts a surface with the flat face portion of the first heat transfer member or the second heat transfer member, the heat of the PTC element is efficiently conducted to the aforementioned heat transfer members so as to improve a warming efficiency.

According to the preferred aspect described in the (C) above, the PTC element is clamped by the first heat transfer member and the second heat transfer member, and is held in the state urged through the elastic claw and the like on the second heat transfer member side so as to improve an assembly property and a holding characteristic.

According to the preferred aspect described in (D) above, first, the first heat transfer member includes the cylinder portion disposed in the axis line direction of the pipe member, and the terminal member provided in the state wherein one portion of the cylinder portion is cut and raised so as to reduce the number of components. Additionally, even if the first heat transfer member is integrated with the pipe member by the insert molding, the horizontal slit and the concave-convex portion or the wavelike portion provided in the cylinder portion increase a contact area with the pipe member so as to increase a binding force. As a result, in the present invention, even after contraction and expansion are repeated due to a temperature difference and the like, a fissure or crack is difficult to occur between both members so as to prolong the life of the device.

According to the preferred aspect described in (E) above, first, the second heat transfer member includes the substrate portion disposed in the positioning space (gap and the like) provided in the pipe member, and the terminal member formed to extend in the substrate portion thereof so as to reduce the number of the components. Additionally, the substrate portion can press to the PTC element side by the elastic claw so as to hold the PTC element in a stable state.

Effect of the Invention

The present invention has a structure comprising the pipe member; the heating member; the first heat transfer member and the second heat transfer member, made of metal; and the terminal member, and at least one of the first heat transfer member and the second heat transfer member forms the terminal member at one portion so as to reduce the number of the components. Also, the first heat transfer member is provided in the pipe member in such a way not to be exposed inside the flow channel of the pipe member so as not to contact the fluid flowing through a passage. Accordingly, a conventional possibility of corrosion of the heat transfer member (the pipe segment in the Patent Document 1) or the heating member connected to the heat transfer member can be completely solved.

BEST MODES OF CARRYING OUT THE INVENTION

Figure 1A:
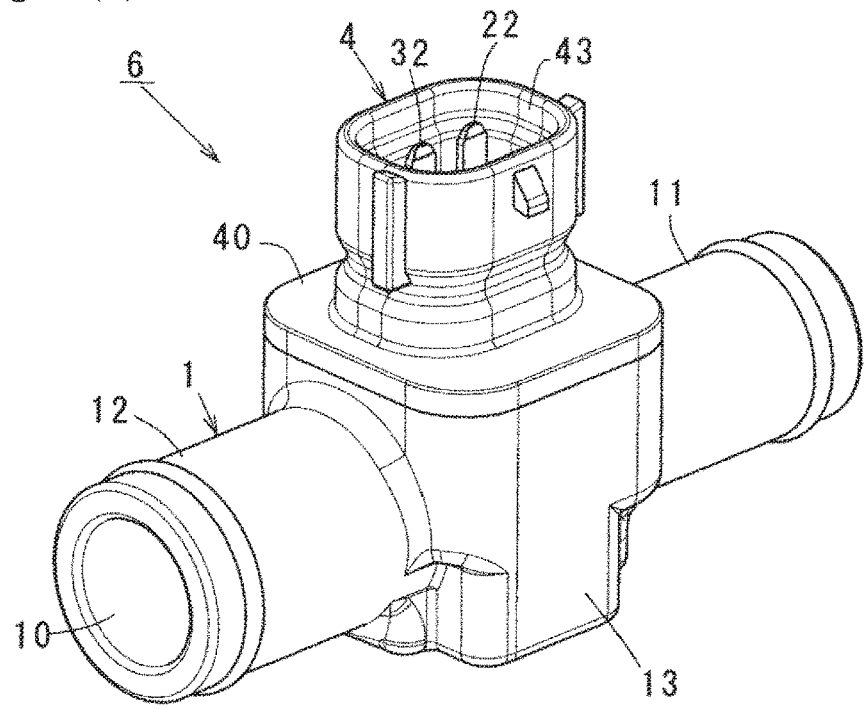
FIG. 1(a) is a perspective view showing a fluid pipe device of the first embodiment.
Figure 1B:
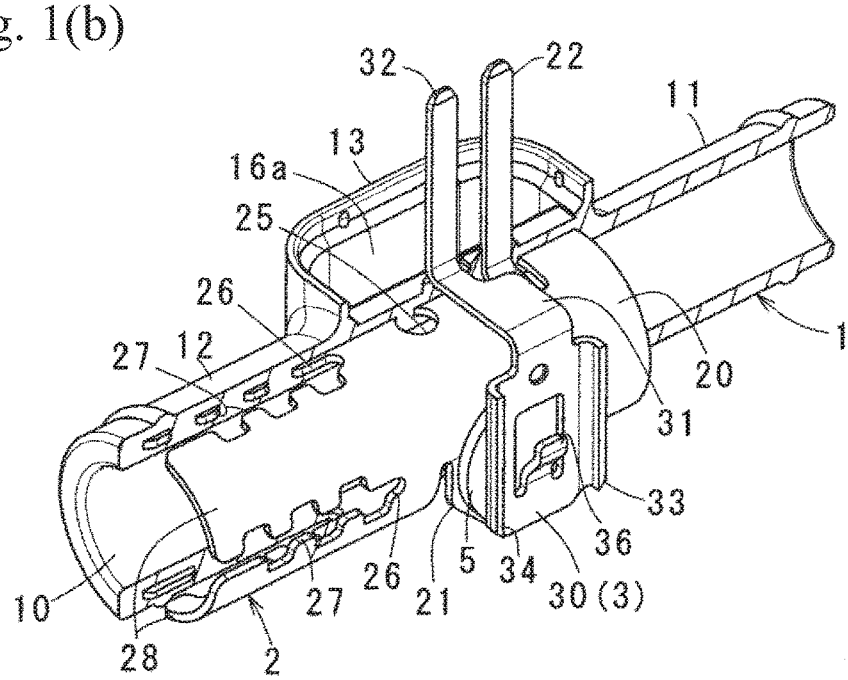
FIG. 1(b) is a pattern structural view showing a pipe member with a first heat transfer member of the pipe device in a state wherein the pipe member is broken to approximately half.

Optimum embodiments of the present invention will be explained with reference to the attached drawings. In the explanation, the first embodiment shown in FIG. 1(a) to FIG. 8(b) and an operation and advantages thereof, and a second embodiment shown in FIG. 9(a) to FIG. 12(b) and an operation and advantages thereof will be clarified in that order.

(First embodiment) In FIG. 1(a) to FIG. 8(b), a pipe device 6 comprises a pipe member 1 forming a flow channel 10 for a fluid; a PTC element 5 which is a heating member for generating heat to heat the pipe member 1; a first heat transfer member 2 and a second heat transfer member 3 for abutting against the PTC element 5 and conducting the heat of the PTC element 5 to the pipe member 1, i.e., a passage 10 side; and terminal members 22 and 32 allowing to supply an electric power to the PTC element 5 from a power source side.

Also, in the pipe device 6, the first heat transfer member 2 is integrated with the pipe member 1 by insert molding, and the second heat transfer member 3 is assembled to the pipe member 1 with the PTC element 5. Both of the first heat transfer member 2 and the second heat transfer member 3 are formed by a metal material such as copper and the like excellent in heat transfer and electrical conductivity. In the following explanation, after the first heat transfer member 2 and the second heat transfer member 3 are clarified, details of the pipe member 1 will be described.

Figure 3:
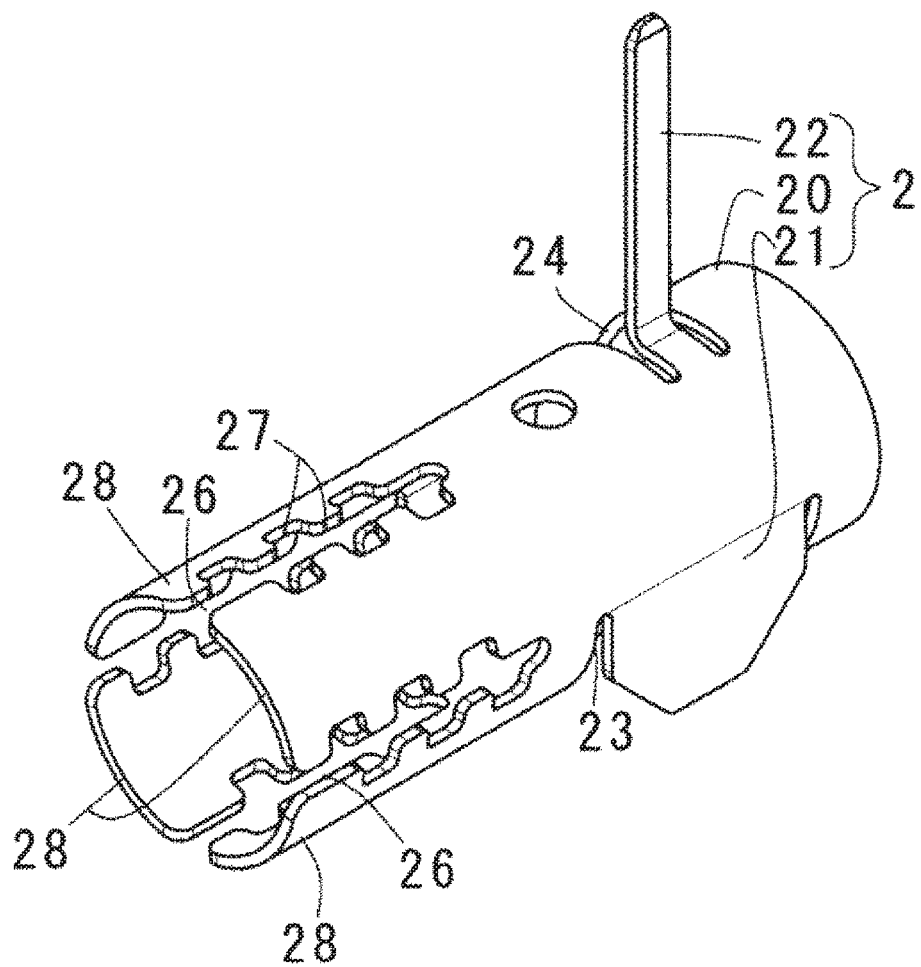
FIG. 3 is a perspective view showing the first heat transfer member as a single item forming the pipe device.

As shown in FIG. 3, the first heat transfer member 2 includes a cylinder portion 20 disposed in an axis line direction of the pipe member 1; a flat face portion 21 and the terminal member 22, which are provided at one end side of the cylinder portion 20; and a plurality (in this example, four) of horizontal slits 26 and wavelike portions or concave-convex portions 27 provided at opposing edge portions of the horizontal slits 26, which are provided at the other end side from an approximately middle of the cylinder portion 20.

The flat face portion 21 is disposed downwardly in Fig. by partitioning one portion of the cylinder portion 20 through an approximately U-shaped slit 23, and cutting and raising. In the flat face portion 21, there is contacted an electrode 5a on one face side of the PTC element 5. The terminal member 22 projects upwardly in FIG. 3 by partitioning one portion of the cylinder portion 20 through an approximately U-shaped slit 24, and cutting and raising in a slender piece shape. Each horizontal slit 26 is provided at a portion equally dividing the cylinder portion 20. In an example shown in the drawing, the cylinder portion 20 is divided into four piece portions 28 from the approximately middle of the cylinder portion to the other end by the four horizontal slits 26. At the opposing edge portions of each piece portion 28, there are provided the wavelike portions or concave-convex portions 27.

Figure 2:
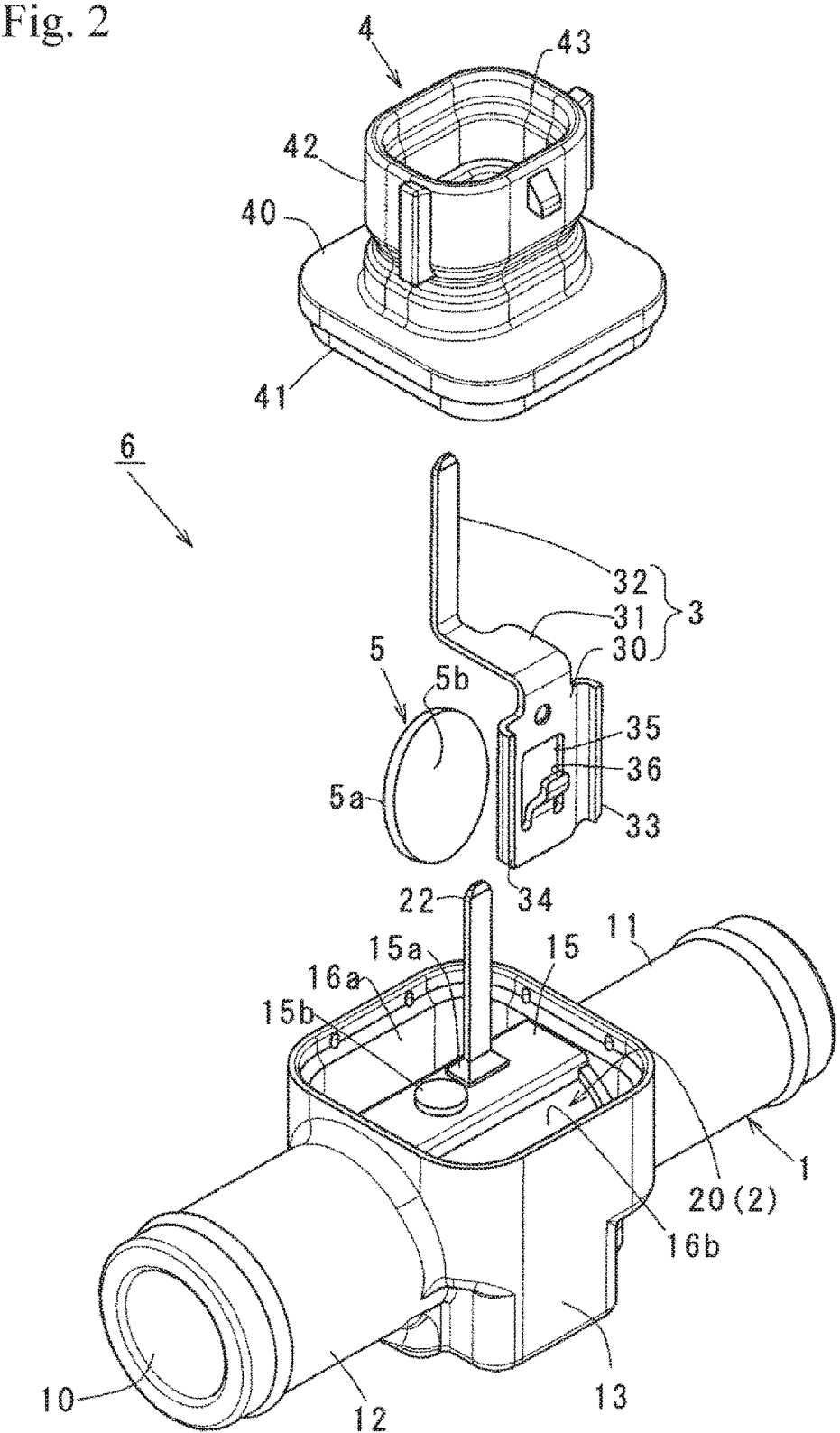
FIG. 2 is a disassembled structural view showing a relationship among members of the aforementioned pipe device.

As shown in FIG. 2, the second heat transfer member 3 includes a substrate portion 30 incorporated in the pipe member 1; the terminal member 32 formed to extend in the substrate portion 30 through a horizontal connection portion 31; and an elastic claw 36 provided in a state wherein one portion of the substrate portion 30 is cut and raised, and capable of pressing the substrate portion to a PTC element 5 side as described later. The substrate portion 30 has an approximately rectangular shape, and includes a flat face portion so as to contact a surface with the PTC element 5, and strength of the substrate portion 30 is reinforced by bending both sides 33 and 34. In the substrate portion 30, there is provided the elastic claw 36 at a center portion. The elastic claw 36 partitions one portion of the substrate portion 30 by an approximately U-shaped slit 35, and is provided in a state wherein an upper side in FIG. 2 is bent outwardly.

On the other hand, the pipe member 1 is a resin molding article to which the first heat transfer member 2 is inserted, and includes the continuous flow channel 10 for flowing the fluid from one side to the other side. Namely, as shown in FIG. 3, the pipe member 1 protrudes a one-side pipe portion 11 and the other-side pipe portion 12 to right and left of a projecting main member 13 in the drawing on a coaxial line. The passage 10 of the pipe member is continuous at the one-side pipe portion 11, the main member 13, and the other-side pipe portion 12, and is partitioned and formed by a resin portion including an end face as well without exposing the first heat transfer member 2, which is an insert article, into the passage.

Figure 6:
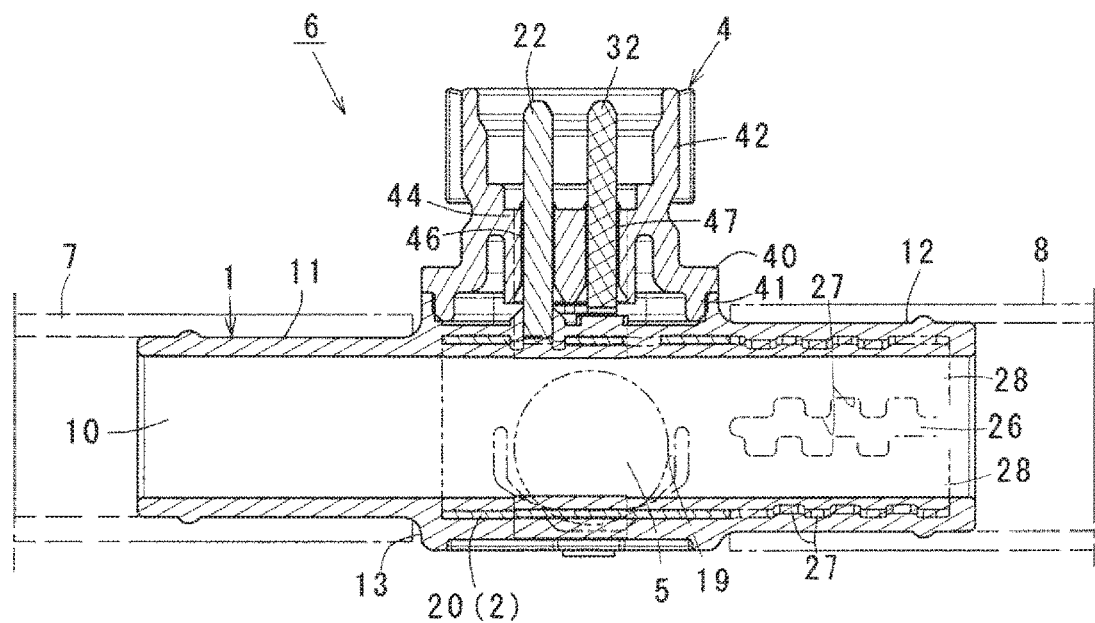
FIG. 6 is a cross-sectional view taken along a line A-A in FIG. 5(a).

As shown in FIG. 6, when the pipe device 6 is incorporated into one portion of an object passage (as for this passage, for example, in a case of a blow-by gas passage structure, the passage becomes an intake passage for circulating a blow-by gas to an engine side), the one-side pipe portion 11 and the other-side pipe portion 12 are connected to the one passage portion 7 and the other passage portion 8 of the passage. In this example, in the aforementioned passage, the one-side pipe portion 11 is connected to the passage portion 7 on an upper flow or a lower flow side, and the other-side pipe portion 12 is connected to the passage portion 8 on a lower flow or an upper flow side.

Figure 7A:
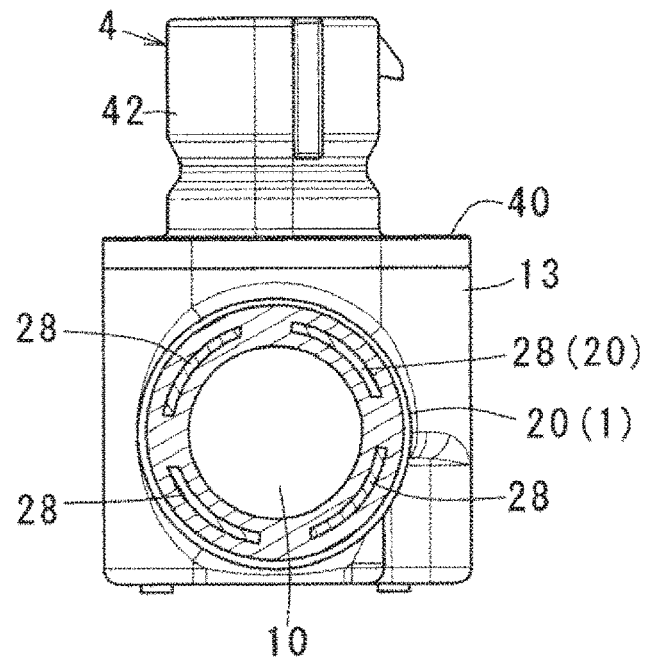
FIGS. 7(a) and 7(b) are a cross-sectional view taken along a line B-B in FIG. 5(b), and a cross-sectional view taken along a line C-C in FIG. 5(b).
Figure 7B:
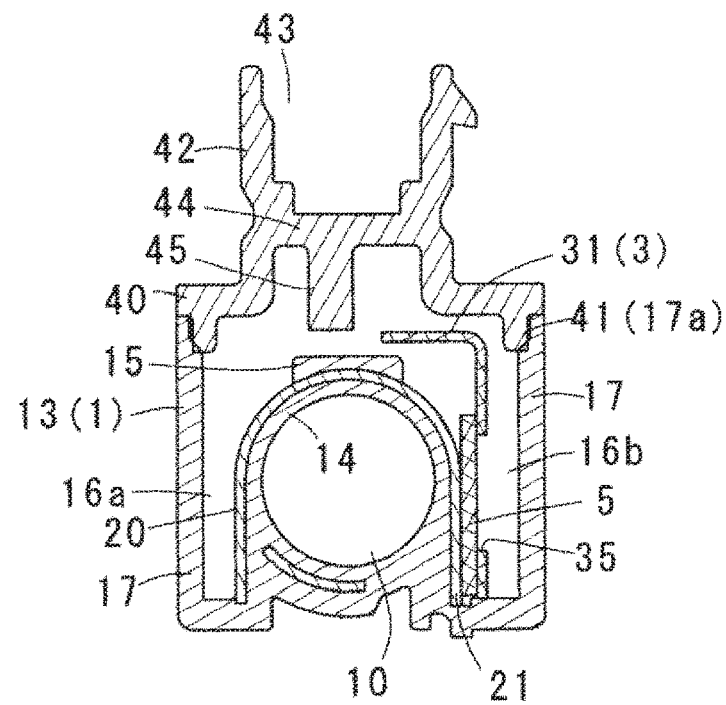
Figure 8A:
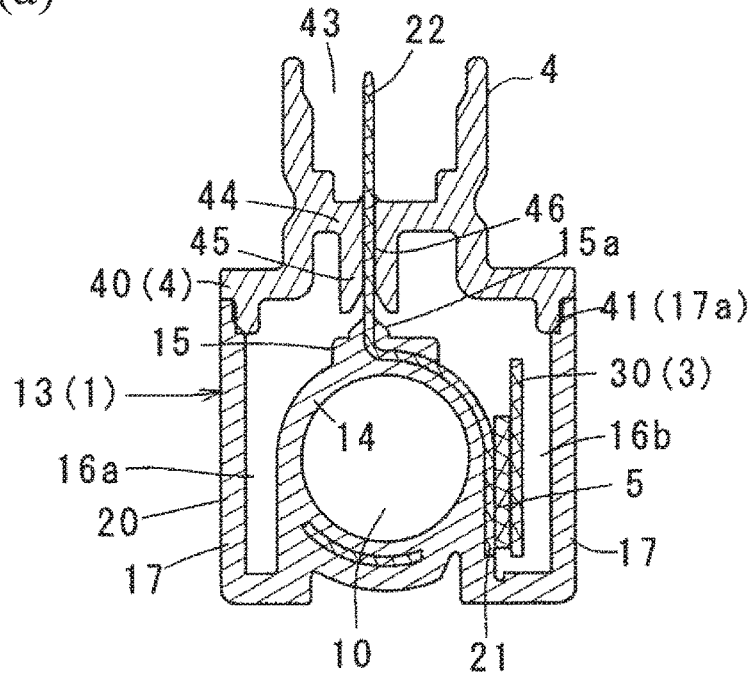
FIGS. 8(a) and 8(b) are a cross-sectional view taken along a line D-D in FIG. 5(b), and a cross-sectional view taken along a line E-E in FIG. 5(b).
Figure 8B:
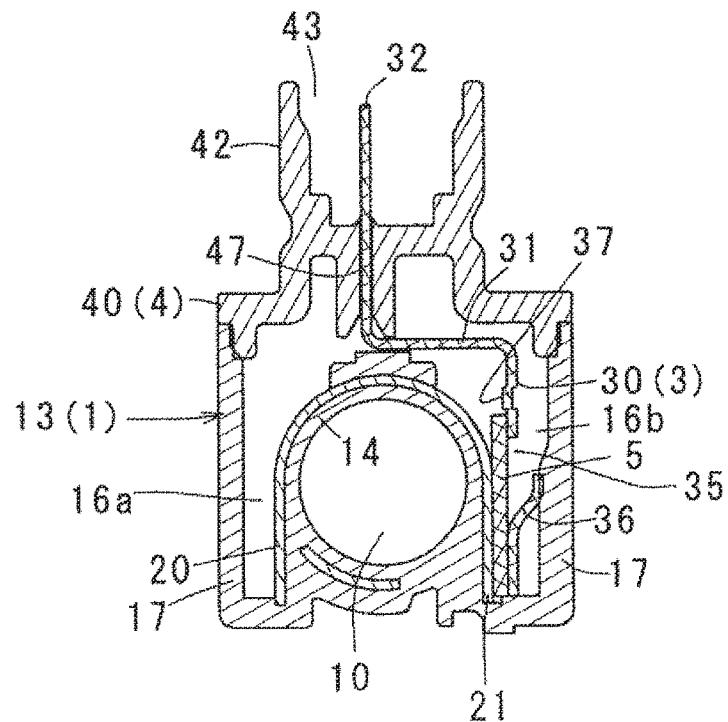

As shown in FIG. 7(b), and FIGS. 8(a) and 8(b), the main member 13 is formed by a pipe portion 14 partitioning one portion of the passage 10; an upper holding portion 15 integrated with an upper side of the pipe portion 14 in the drawings; and outer wall portions 17 and 17 provided through gaps 16a and 16b on both sides of the pipe portion 14. Also, as shown in FIG. 2(b), an upper side of the main member 13 is open in an approximately rectangular shape, and exposes the gaps 16a and 16b. On an upper side opening of the main member 13, a step 17a is provided in an inner side edge portion, and a plug member 4 is attached in a state wherein the plug member 4 is engaged with the step 17a thereof by welding and the like.

In the pipe portion 14, there is integrated the cylinder portion 20 of the first heat transfer member 2 in a state wherein one portion of the cylinder portion 20 is buried inside a thickness of the pipe. As shown in FIG. 2, the upper holding portion 15 is located inside the main member 13, and is extended in the same direction as the passage 10. In the upper holding portion 15, there is buried a base portion of the terminal member 22 of the first heat transfer member 2, and there is provided a pedestal 15b for seating another terminal member 32. The reference sign 15a represents a pedestal portion integrated with the upper holding portion 15 and covering the base portion of the terminal member 22.

Incidentally, in this structure, the first heat transfer member 2 is insert-molded in the main member 13 and the pipe portion 12, so that an assembling operation is omitted. However, the second heat transfer member 3 is assembled to the pipe member 1 together with the PTC element after molding the pipe member 1.

Figure 4A:
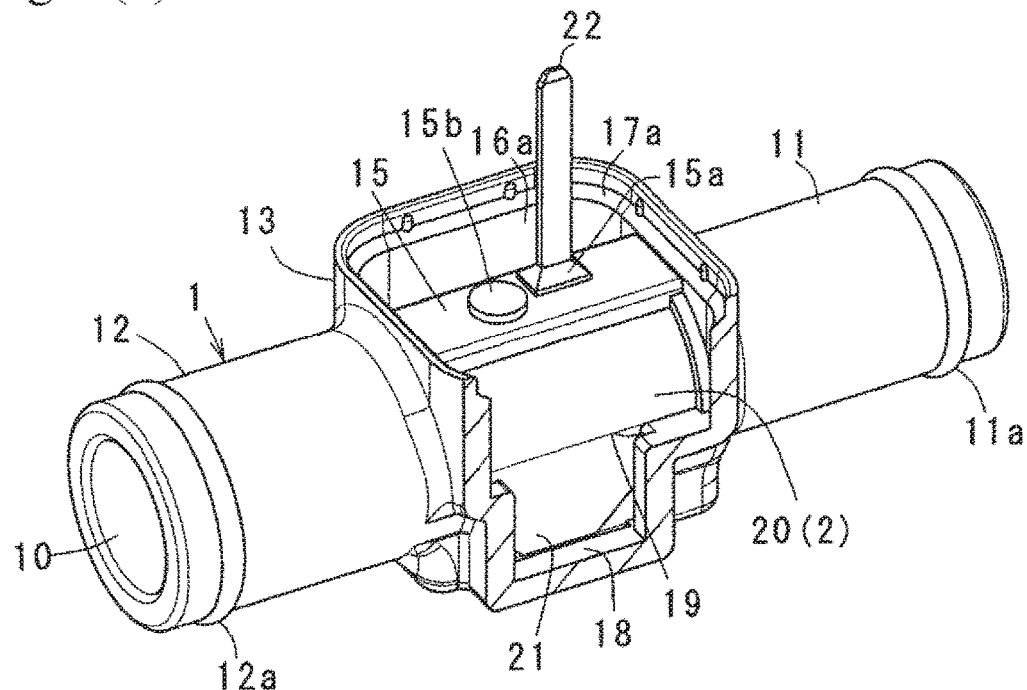
FIG. 4(a) is a structural view showing the pipe device wherein one portion is broken in a state before a plug member is mounted.

As shown in FIG. 4(a), in the aforementioned gap 16b, there are provided a positioning space 18, and a holding concave portion 19 provided on a deep side of the positioning space 18. In the positioning space 18, there is held the second heat transfer member 3. In the holding concave portion 19, there is held the PTC element 5 having a circular flat plate shape. Namely, first, the PTC element 5 is fitted and held in the holding concave portion 19 in a state wherein one face abuts against an outer face of the flat face portion 21 of the first heat transfer member 2. After that, in the second heat transfer member 3, the substrate portion 30 is pressed into the positioning space 18 downwardly from an upper side in the drawing so to be fitted, and as shown in FIG. 8(b), the substrate portion 30 is urged to the PTC element 5 side by the elastic claw 36 so as to be elastically held.

Here, the PTC element 5 is a semiconductor ceramic using, for example, barium titanate and the like as a main material, and includes electrodes 5a and 5b respectively provided on opposing surfaces. The electrodes 5a and 5b are formed by silver and the like excellent in electrical conductivity and heat transfer. However, the heating member of the present invention may be a member other than the PTC element 5, and may use a known sheet heating element as well.

As shown in FIGS. 8(a) and 8(b), the plug member 4 includes a flange-shaped plate portion 40 closing the upper side opening of the main member 13; a frame portion 41 provided on a lower face of the plate portion 40 and engaging the step 17a of the inner side edge portion of the main member 13; a rectangular torso portion 42 projected on an upper face of the plate portion 40; a projection portion 45 provided downwardly on a bottom face 44 of the torso portion; and two insertion holes 46 and 47 provided in the projection portion 45 and passing vertically through.

Namely, the plug member 4 is a member connecting a connector and the like on the power source side, and in a case of mounting on the main member 13, the aforementioned terminal member 22 is passed through an inner portion 43 of the torso portion from one insertion hole 46, and the terminal member 32 is passed through the inner portion 43 of the torso portion from the other insertion hole 47. After that, the frame portion 41 fits in the step 17a on a main member side, and is integrally attached to a main member 13 side by the welding and the like.

(Advantages) The pipe device 6 above excels in the following respects compared to a conventional structure such as Patent Document 1.

(1) The pipe device 6 of the first embodiment has a structure comprising the pipe member 1; the first heat transfer member 2 and the second heat transfer member 3, made of metal; the heating member 5; and the terminal members 22 and 32, and the first heat transfer member 2 and the second heat transfer member 3 form the terminal members 22 and 32 at one portion not only to reduce the number of components, but also simplify an assembly as well.

(2) Also, the first heat transfer member 2 is integrated with the pipe member by the insert molding not to expose inside the flow channel 10 of the pipe member 1, so that it does not contact the fluid flowing in the passage 10. This advantage can completely solve a conventional possibility of corrosion of the heat transfer member (a pipe segment in the Patent Document 1) or the heating members 2 and 3 connected to the heat transfer member, and can efficiently warm a wide range of the flow channel 10 further by extending the first heat transfer member 2 in an axial direction of the pipe member 1.

(3) Also, the first heat transfer member 2 is divided into a plurality of piece portions 28 by the horizontal slits from the approximately middle of the cylinder portion 20 which is an insert portion to the other end, and in the edge portion of each piece portion 28, there is formed the wavelike portion or the concave-convex portion 27. In a case wherein the first heat transfer member 2 is integrated with the pipe member 1 by the insert molding, the aforementioned structures increase a contact area with the resin portion forming the pipe member 1 so as to provide a sufficient binding force relative to the pipe member 1. As a result, in the embodiment, even after expansion and contraction are repeated due to a temperature difference and the like, a fissure or crack is difficult to occur between both members so as to prolong the life of the device.

Figure 4B:
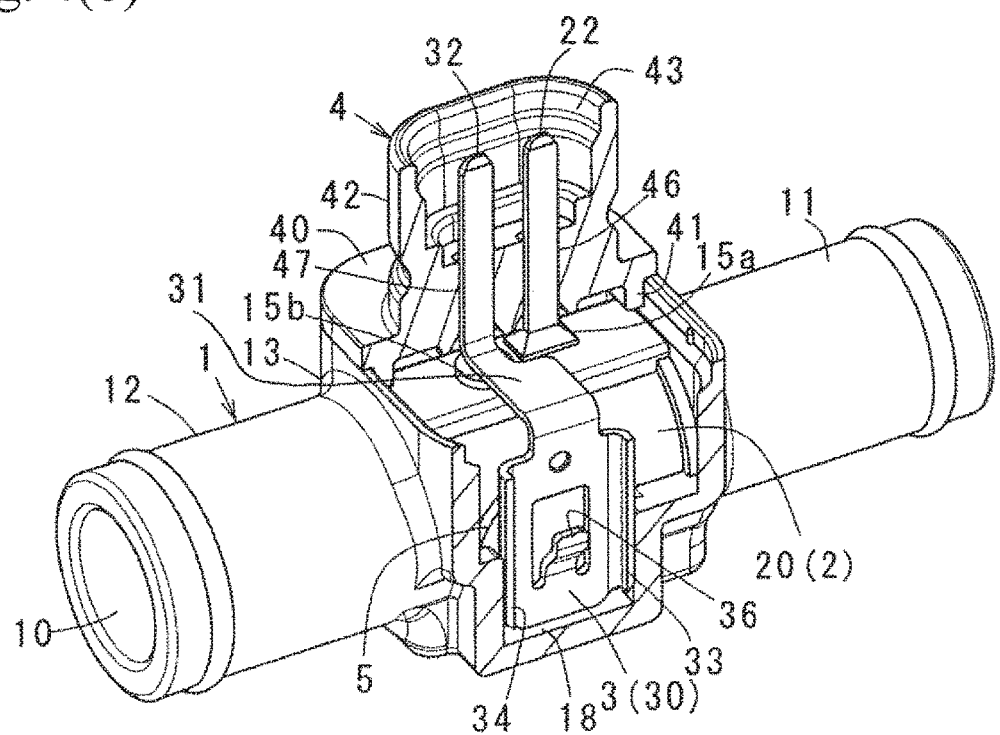
FIG. 4(b) is a structural view showing the pipe device wherein one portion is broken in a state wherein the plug member is mounted.
Figure 5A:
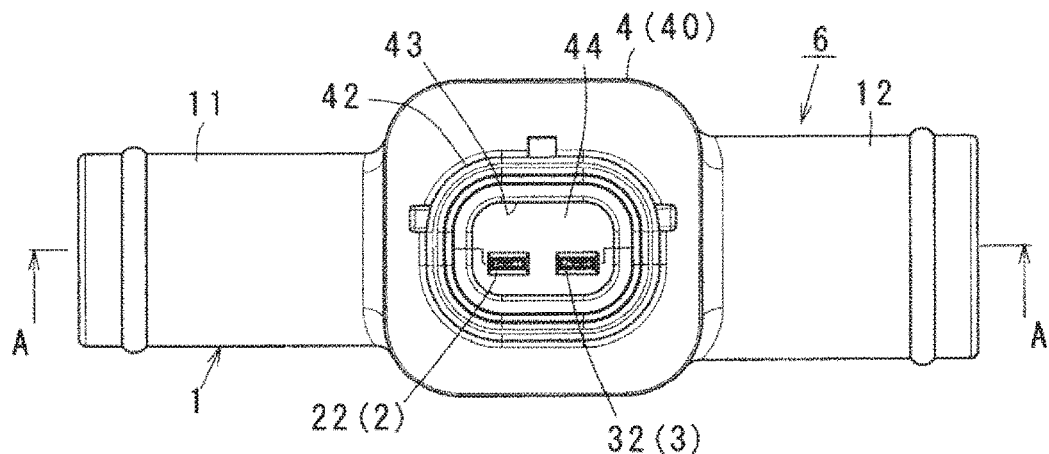
FIGS. 5(a) and 5(b) are a top view and a front view showing the pipe device.
Figure 5B:
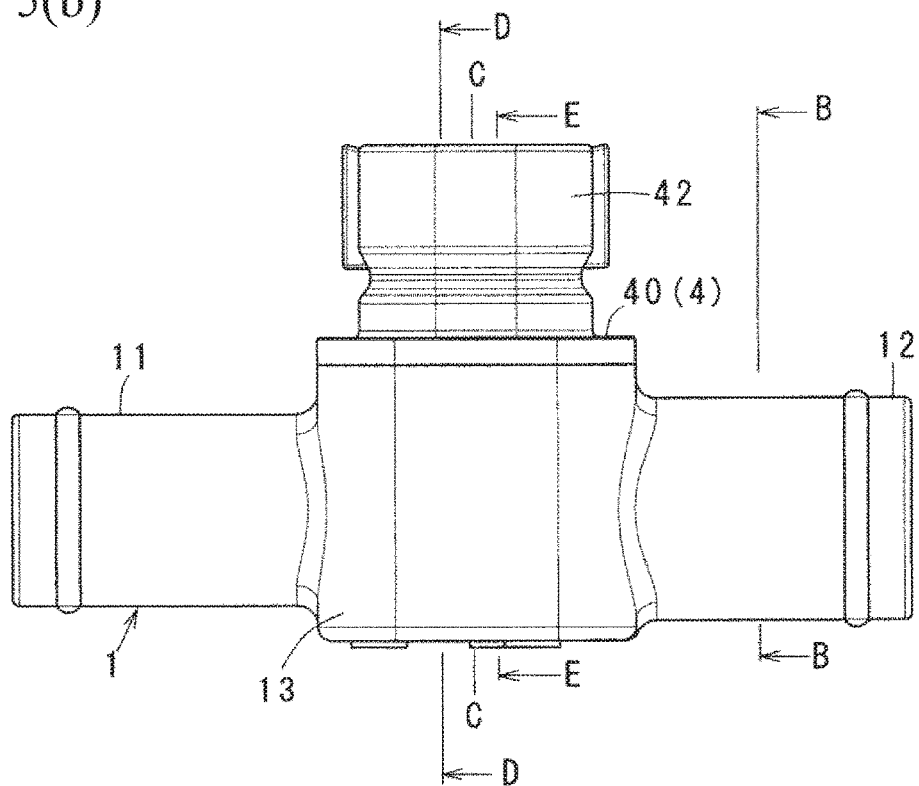

(4) Also, in the second heat transfer member 3, the substrate portion 30 and the horizontal connection portion 31 are bent approximately at right angles, and the horizontal connection portion 31 and the terminal member 32 are bent approximately at right angles. Then, in an incorporated state into the pipe member 1, as shown in FIG. 4(b), the substrate portion 30 is pressed into the positioning space 18 in a non-oscillating manner, and the horizontal connection portion 31 is held in the pedestal 15b provided in the upper holding portion 15. The above members are provided as a countermeasure against possibilities that an external force is applied to the second heat transfer member 3 from above, and the second heat transfer member 3 unintentionally contacts the first heat transfer member 2 at a time of assembling operation so as to short-circuit, or the like. Also, as shown in FIG. 8(b), in the second heat transfer member 3, there is provided a projection 37 formed by a half-punch and the like at an upper side portion of the slit 35. In the PTC element 5, a movement in an upward direction is controlled by the projection 37 thereof.

(5) Also, the pipe device 6 uses the PTC element 5 having the flat plate shape as the heating member, and the electrode 5a of the PTC element 5 contacts the surface with the flat face portion 21 on a first heat transfer member side, and another electrode 5b contacts the surface with the substrate portion 30 on a second heat transfer member side so as to allow a reliable electrical connection, and simultaneously, the heat of the PTC element 5 can efficiently conduct to the heat transfer member 2 or 3 so as to improve a warming efficiency.

(6) Simultaneously, in the structure, as shown in FIGS. 8(a) and 8(b), the PTC element 5 is clamped by the flat face portion 21 of the first heat transfer member 2 and the substrate portion 30 of the second heat transfer member 3, and is held in a state urged through the elastic claw 36 of the second heat transfer member 3. As a result, in the embodiment, an assembly property and a holding characteristic of the PTC element 5 can be improved.

(Second Embodiment) In FIG. 9(a) to FIG. 12(b), a pipe device 6A is the same as the first embodiment in that it comprises a pipe member 9 forming a flow channel 90 for a fluid; a PTC element 5A which is a heating member for generating heat to heat the pipe member 9; a first heat transfer member 2A and a second heat transfer member 3A for abutting against the PTC element 5A and conducting the heat of the PTC element 5A to the pipe member 9, i.e. a passage 90 side; and the terminal members 22 and 32 allowing to supply the electric power to the PTC element 5A from the power source side. Differences are, for example that after the pipe member 9 is molded, the assembling operation of the first heat transfer member 2A and the second heat transfer member 3A and the PTC element 5A relative to the pipe member 9 is carried out. Incidentally, in FIG. 9(a) to FIG. 12(b), the same reference signs are assigned to portions same as or similar to the aforementioned first embodiment.

Figure 10:
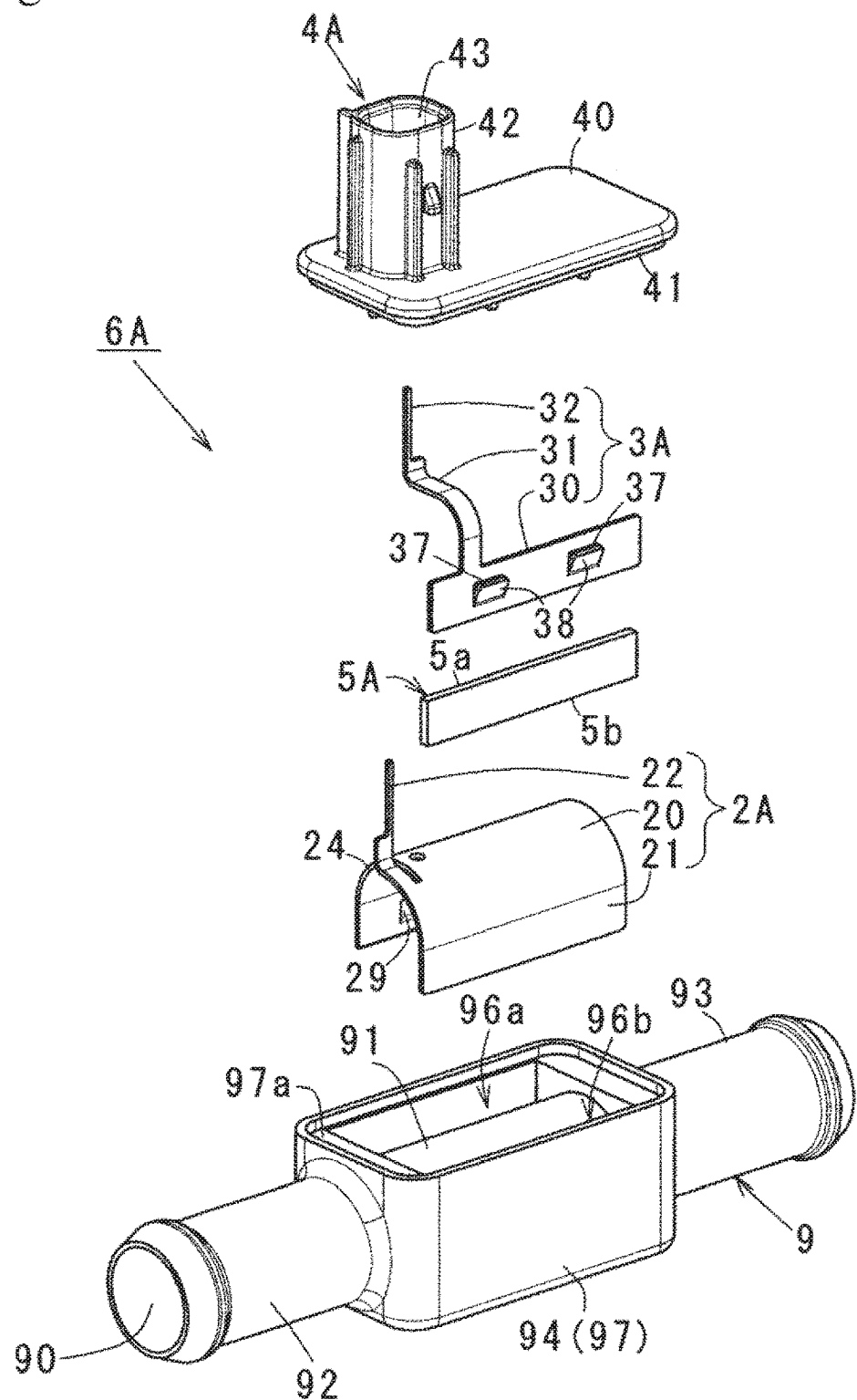
FIG. 10 is a disassembled structural view showing a relationship among members of the pipe device in FIGS. 9(a) and 9(b).

The pipe member 9 is the resin molding article by injection molding, and as shown in FIG. 10, a pipe portion 91 disposed inside a projecting main member 94, and a one-side pipe portion 92 and the other-side pipe portion 93 protruding to right and left of the main member 94 are provided on a coaxial line. Also, the pipe portions 91 to 93 form the continuous flow channel 90 for flowing the fluid from one side to the other side.

Figure 12A:
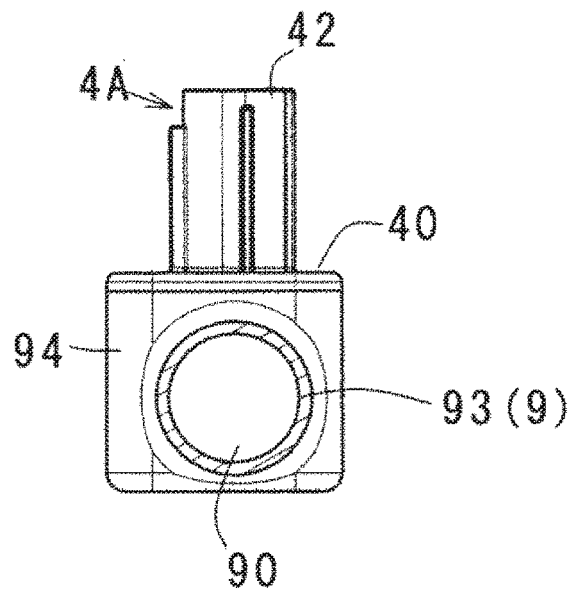
FIGS. 12(a) and 12(b) are a cross-sectional view taken along a line F-F in FIG. 11(b), and a cross-sectional view taken along a line G-G in FIG. 11(b).
Figure 12B:
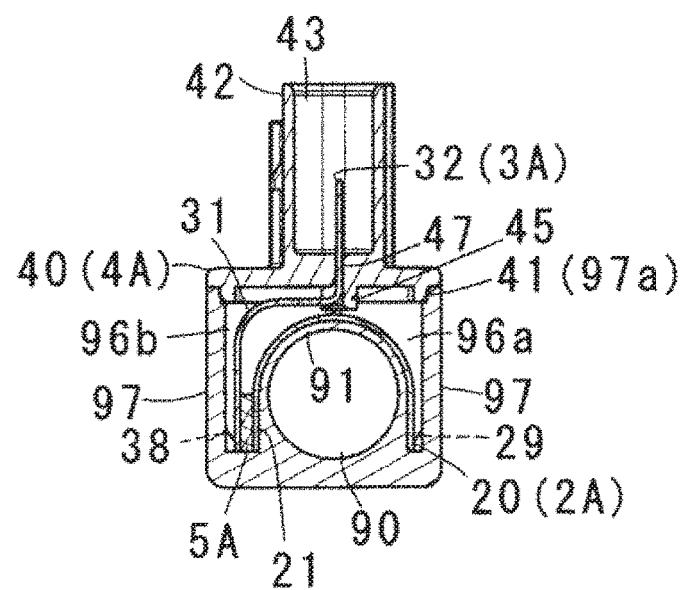
Figure 13A:
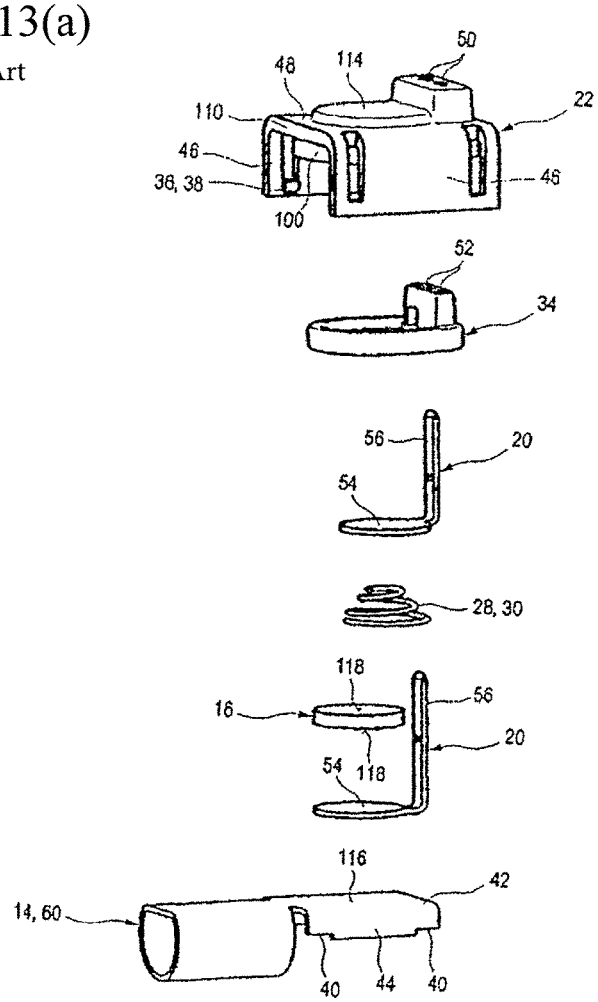
FIGS. 13(a) and 13(b) are explanatory views corresponding to FIG. 4 and FIG. 7 in Patent Document 1.
Figure 13B:
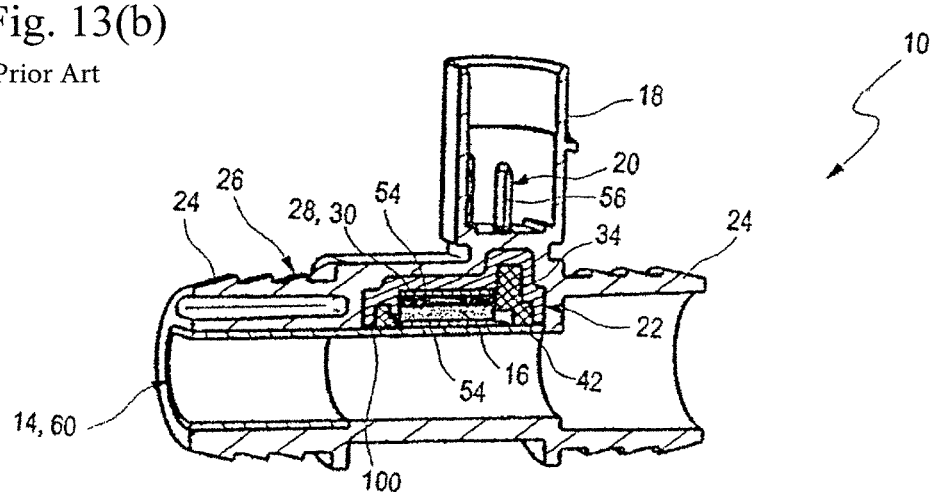

Among those, as shown in FIG. 10, and FIGS. 12(a) and 12(b), the main member 94 includes the pipe portion 91 partitioning one portion of the passage 90; and outer wall portions 97 and 97 provided through gaps 96a and 96b on both sides sandwiching the pipe portion 91. Also, an upper side in the drawing of the main member 94 is open in an approximately rectangular shape, and exposes the gaps 96a and 96b. On an upper side opening of the main member 94, a step 97a is provided at an inner side edge portion, and a plug member 4A is attached in a state wherein the plug member 4A is engaged with the step 97a thereof by the welding and the like.

Figure 11A:
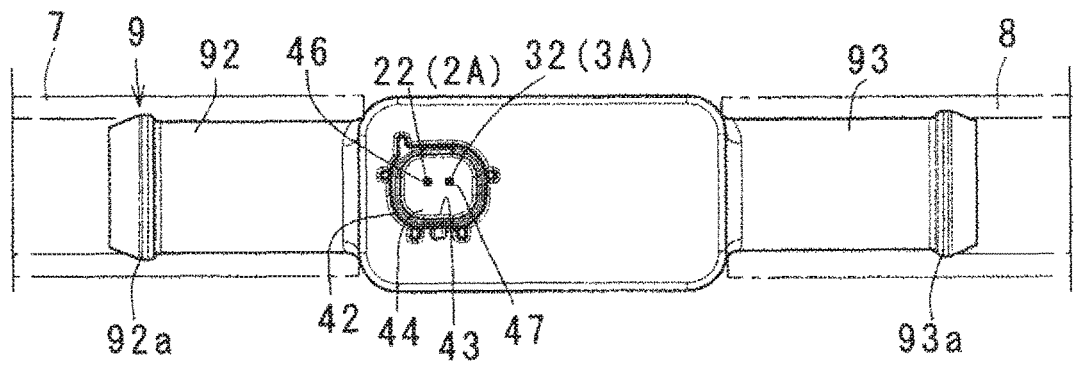
FIGS. 11(a) and 11(b) are a top view and a front view showing the pipe device in FIGS. 9(a) and 9(b).
Figure 11B:
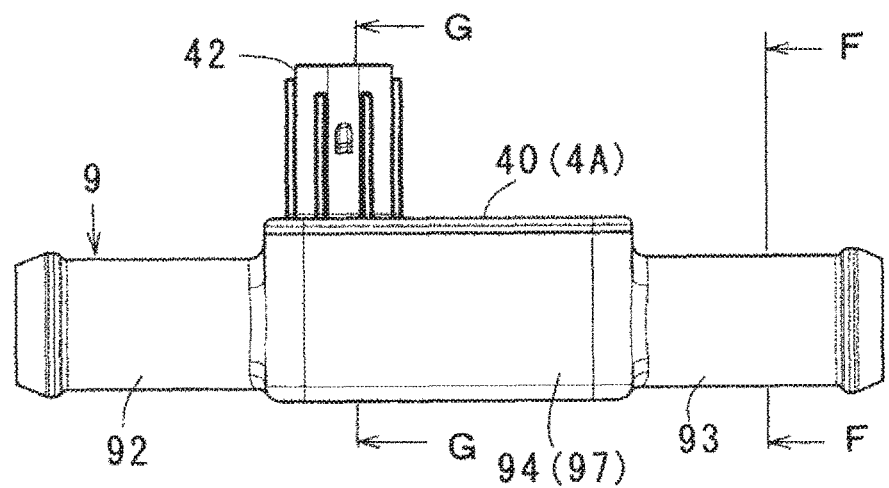

As shown in FIGS. 11(a) and 11(b), when the pipe device 6A is incorporated into one portion of the object passage (as for this passage, for example, in the case of the blow-by gas passage structure, the passage becomes the intake passage for circulating the blow-by gas to the engine side), the one-side pipe portion 92 and the other-side pipe portion 93 are connected to one passage portion 7 and the other passage portion 8 of the passage. In an example shown in the drawings, in the aforementioned passage, the one-side pipe portion 92 is connected to the passage portion 7 on the upper flow or the lower flow side, and the other-side pipe portion 93 is connected to the passage portion 8 on the lower flow or the upper flow side.

The first heat transfer member 2A and the second heat transfer member 3B are respectively formed by the metal material such as copper and the like excellent in heat transfer and electrical conductivity. As shown in FIG. 10, the first heat transfer member 2A includes a half-cylinder portion 20 disposed in such a way as to cover an outer periphery of the pipe portion 91 inside the main member; a flat face portion 21 provided at a lower portion on one side of the half-cylinder portion 20; a terminal member 22 provided through a slit 24 at one end side in a longitudinal direction of the half-cylinder portion 20; and a plurality (in this example, two) of elastic claws 29 provided at a lower portion on the other side of the half-cylinder portion 20.

The half-cylinder portion 20 is disposed such that a cylinder inner face is superposed on an outer face of the pipe portion 91 in a state inserted into the gaps 96a and 96b. In the flat face portion 21, there is contacted an electrode 5a on one face side of the PTC element 5A. The terminal member 22 is positioned at one end side in the longitudinal direction of the half-cylinder portion 20, is partitioned through the arc-shaped slit 24, and protrudes upwardly in the drawing by being cut and raised in a slender piece shape. As imagined from FIG. 12(b), the elastic claw 29 elastically engages an inner face of the corresponding outer wall portion 97 inside the gap 96a or 96b in a state wherein the half-cylinder portion 20 is superposed on the pipe portion 91 so as to allow the first heat transfer member 2A to be restrained inside the main member 94.

As shown in FIG. 10, the second heat transfer member 3A includes a substrate portion 30 incorporated in the gap 96b of the main member; the terminal member 32 formed to extend at one portion of the substrate portion 30 through the horizontal connection portion 31; and a plurality (in this example, two) of elastic claws 38 provided in a state wherein one portion of the substrate portion 30 is cut and raised, and capable of pressing the substrate portion to a PTC element 5A side. The substrate portion 30 has an approximately rectangular shape having approximately the same size as the flat face portion 21, and can contact a surface with the PTC element 5A, and an electrode 5b of the PTC element contacts. Each elastic claw 38 partitions one portion of the substrate portion 30 by an approximately U-shaped slit 37, and is provided in a state wherein an upper side in the drawing is bent outwardly.

The second heat transfer member 3A is incorporated together with the PTC element 5A relative to the main member 94. The PTC element 5A is a semiconductor ceramic having a rectangular plate shape using the barium titanate and the like as the main material, and includes the electrodes 5a and 5b respectively provided on opposing surfaces. The electrodes 5a and 5b are formed by the silver and the like excellent in electrical conductivity and heat transfer.

In an assembly procedure of the aforementioned respective members, from a state wherein the first heat transfer member 2A is restrained and held in the main member 94 as mentioned above, the PTC element 5A is inserted into the gap 96b to contact the surface with the flat face portion 21, and after that, the substrate portion 30 of the second heat transfer member is inserted between the PTC element 5A and the corresponding outer wall portion 97. Then, in the second heat transfer member 3A, the substrate portion 30 is downwardly inserted between the PTC element 5A and the corresponding outer wall portion 97 to be fitted, and as shown in FIG. 12(b), the second heat transfer member 3A is retained by the elastic claw 38, and is elastically held in a state urged to the PTC element 5A side.

Figure 9A:
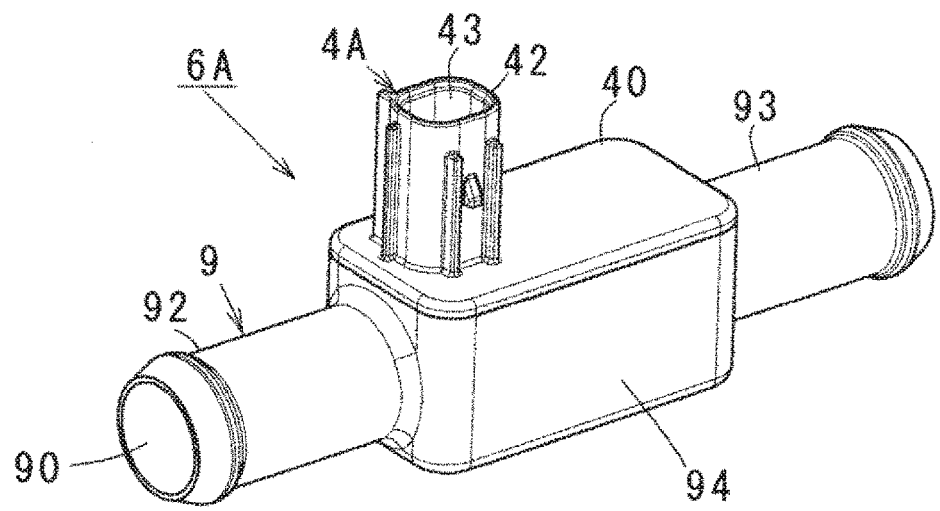
FIG. 9(a) is a perspective view showing the fluid pipe device of a second embodiment.
Figure 9B:
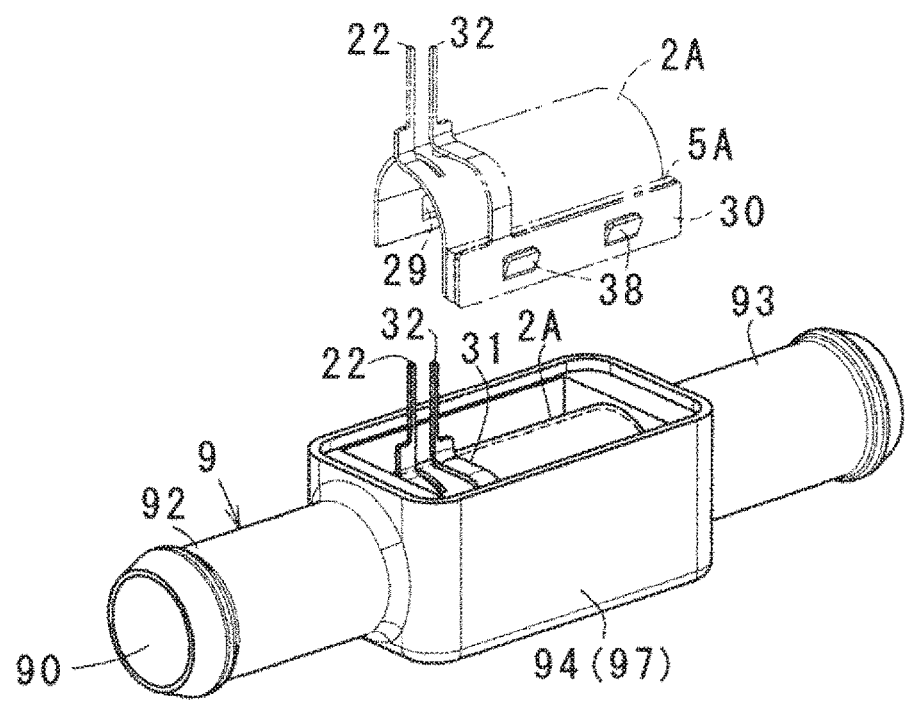
FIG. 9(b) is a pattern structural view for an explanation showing the fluid pipe device in a state wherein the plug member is removed.

As for another assembly procedure, as shown in FIG. 9(b), in a state wherein the PTC element 5A is positioned and disposed in the flat face portion 21 relative to the first heat transfer member 2A, and the substrate portion 30 of the second heat transfer member 3A is positioned and disposed in the PTC element 5A thereof, i.e., after the first heat transfer member 2A, the PTC element 5A, and the second heat transfer member 3A are associated with one another, the aforementioned members may be operated to be pressed into an inner side of the main member 94. In this operation, as shown in FIG. 12(b), the first heat transfer member 2A is restrained and held inside the main member 94 through the plurality of elastic claws 29 on a half-cylinder portion side, and simultaneously, the second heat transfer member 3A is restrained and held inside the main member 94 together with the PTC element 5A through the plurality of elastic claws 38 on a substrate portion side. The PTC element 5A is located in a state clamped between the flat face portion 21 and the substrate portion 30 by a predetermined pressure.

As shown in FIG. 10, the plug member 4A includes the flange-shaped plate portion 40 closing the upper side opening of the main member 94; the frame portion 41 provided on the lower face of the plate portion 40 and engaging the step 97a of the inner side edge portion of the main member 94; the rectangular torso portion 42 projected on the upper face of the plate portion 40; the projection portion 45 provided downwardly on the bottom face 44 of the torso portion; and the two insertion holes 46 and 47 provided in the projection portion 45 and the bottom face 44, and passing vertically through (see FIG. 11(a)).

Namely, the plug member 4A is the member connecting the connector and the like on the power source side, and in a case of mounting on the main member 94, the aforementioned terminal member 22 is passed through the inner portion 43 of the torso portion from one insertion hole 46, and the terminal member 32 is passed through the inner portion 43 of the torso portion from the other insertion hole 47. After that, the frame portion 41 fits in the step 97a on the main member side, and is integrally attached to the main member 13 side by the welding and the like.

(Advantages) The pipe device 6A above excels in the following respects as well compared to the conventional structure such as the Patent Document 1.

(1) The pipe device 6A of the second embodiment has a structure comprising the pipe member 9; the first heat transfer member 2A and the second heat transfer member 3A, made of metal; the PTC element 5A which is the heating member; and the terminal members 22 and 32, and the first heat transfer member 2A and the second heat transfer member 3A form the terminal members 22 and 32 at one portion not only to reduce the number of components, but also simplify the assembly as well.

(2) Also, the first heat transfer member 2A and the second heat transfer member 3A, and the PTC element 5A can be easily assembled inside the main member 94 of the pipe member 9, and are assembled inside the main member 94 in such a way not to be exposed inside the flow channel 90 not to contact the fluid flowing in the passage 90. This advantage can completely solve the conventional possibility of the corrosion of the heat transfer member (the pipe segment in the Patent Document 1) or the heating members 2A and 3A connected to the heat transfer member.

(3) The PTC element 5A is the same as the first embodiment in terms of being disposed inside the main member 41 of the pipe member; however, the first heat transfer member 2A is incorporated inside the main member 94 after molding so as to easily assure that an area of the flat face portion 21 allowing to contact the surface with the PTC element 5A becomes an arbitrary size. As a result, as in this example, a relatively large PTC element 5A can be used as well.

(4) Also, in the second heat transfer member 3A, the substrate portion 30 and the horizontal connection portion 31 are bent approximately at right angles, and the horizontal connection portion 31 and the terminal member 32 are bent approximately at right angles. Then, in an incorporated state into the pipe member 9, as shown in FIG. 12(*b*), the substrate portion 30 is pressed and held in the non-oscillating manner through the elastic claw 38. Incidentally, structurally, there may be provided a portion such as the projection 37 of the first embodiment in the substrate portion 30 of the second heat transfer member so as to reliably control the movement in the upward direction of the PTC element 5A by the projection 37 thereof.

(5) Also, the pipe device 6A uses the PTC element 5A having the flat plate shape as the heating member, and the electrode 5*a* of the PTC element 5 contacts the surface with the flat face portion 21 on the first heat transfer member side, and another electrode 5*b* contacts the surface with the substrate portion 30 on the second heat transfer member side so as to allow the reliable electrical connection, and simultaneously, heat of the PTC element 5A can be efficiently conducted to the heat transfer member 2A or 3A so as to improve the warming efficiency.

(6) Simultaneously, in the structure, as shown in FIG. 12(*b*), the PTC element 5A is clamped by the flat face portion of the first heat transfer member 2A and the substrate portion 30 of the second heat transfer member 3A, and is held in a state urged through the elastic claw 38 of the second heat transfer member 3A. As a result, in the embodiment as well, the assembly property and the holding characteristic of the PTC element 5A can be improved.

Incidentally, the present invention is not restricted to the aforementioned embodiments at all provided that they substantially comprise the structures specified in the aspects, and details can be variously modified as needed. As for one example, both members of the first heat transfer member 2 and the second heat transfer member 3 may be integrated relative to the pipe member 1 by the insert molding, or further, the respective first and second heat transfer members 2 and 3, and the PTC element 5 may be integrated relative to the pipe member 1 by the insert molding.

Applications are not limited to the blow-by gas passage structure, and when the fluid such as a gas, liquid, or the like flowing in the passage inside the pipe is desired to be warmed, the present invention is used by being appropriately incorporated into one portion of a pipe system thereof.

EXPLANATION OF SYMBOLS

1 . . . a pipe member (10 is a passage, 11 and 12 are pipe portions, and 13 is a main member.)

2 . . . a first heat transfer member (22 is a terminal member, 26 is horizontal slits, and 27 is concave-convex portions.)

2A . . . a first heat transfer member (22 is a terminal member, and 29 is elastic claws.)

3 . . . a second heat transfer member (30 is a substrate portion, 31 is a horizontal connection portion, and 36 is an elastic claw.)

3A . . . a second heat transfer member (30 is a substrate portion, 31 is a horizontal connection portion, and 38 is elastic claws.)

4 . . . a plug member (40 is a plate portion, and 42 is a torso portion.)

4A . . . a plug member (40 is a plate portion, and 42 is a torso portion.)

5 . . . a PTC element (a heating member)

5A . . . a PTC element (a heating member)

6 . . . a pipe device

6A . . . a pipe device

7 . . . a pipe

8 . . . a pipe

9 . . . a pipe member (90 is a passage, 91 to 93 are pipe portions, and 94 is a main member.)

21 . . . a flat face portion

22 . . . a terminal member

32 . . . a terminal member

Incidentally, all contents of the specification, claims, drawings, and abstract of Japanese Patent Application No. 2014-183758 filed on Sep. 10, 2014 are cited in their entireties herein and are incorporated as a disclosure of the specification of the present invention.

What is claimed is:

1. A fluid pipe device, comprising:
a pipe member forming a flow channel for flowing a fluid;
a heating member for generating heat to heat the pipe member;
a metal heat transfer member abutting against the heating member and conducting heat to the pipe member; and
a terminal member electrically connecting the heating member and the metal heat transfer member,
wherein the metal heat transfer member comprises a first heat transfer member and a second heat transfer member, and at least one of the first heat transfer member and second heat transfer member forms the terminal member at one portion, and the first heat transfer member is provided in the pipe member not to be exposed inside the flow channel of the pipe member, and
the first heat transfer member includes
a cylinder portion disposed in an axis line direction of the pipe member;
the terminal member provided in a state wherein one portion of the cylinder portion is cut and raised;
a horizontal slit provided in the cylinder portion and extending in the axis line direction; and
a concave-convex portion or a wave-shaped portion provided in an edge portion of the horizontal slit.

2. A fluid pipe device according to claim 1, wherein the first heat transfer member is integrated with the pipe member by insert molding.

3. A fluid pipe device according to claim 1, wherein the heating member includes a PTC element having a flat plate shape, and the first heat transfer member and/or second heat transfer member includes a portion abutting against an electrode of the PTC element formed in a flat portion.

4. A fluid pipe device according to claim 3, wherein the PTC element is clamped by the first heat transfer member and second heat transfer member, and is held in a state urged from a second heat transfer member side.

5. A fluid pipe device comprising:
a pipe member forming a flow channel for flowing a fluid;
a heating member for generating heat to heat the pipe member;
a metal heat transfer member abutting against the heating member and conducting heat to the pipe member, the metal heat transfer member including
a first heat transfer member provided in the pipe member not to be exposed inside the flow channel of the pipe member, and including a cylinder portion arranged in an axis line direction of the pipe member, and a second heat transfer member including a substrate portion having a rectangular shape and disposed in a positioning space provided in the pipe member to contact the heating member;

a terminal member formed to extend from the substrate portion and electrically connecting to the heating member; and an elastic claw provided in a state wherein one portion of the substrate portion is cut and raised, and capable of pressing the substrate portion against the heating member; and a main member surrounding the pipe member, the heating member, the first heat transfer member, and the second transfer member.

6. A fluid pipe device comprising:

a pipe member forming a flow channel for flowing a fluid;

a heating member for generating heat to heat the pipe member; and first and second heat transfer members made of metal and abutting against the heating member to conduct heat to the pipe member, the first heat transfer member having a shape different from that of the second heat transfer member, and including a cylinder portion or a half-cylinder portion disposed in an axis line direction of the pipe member, and a terminal member formed from cutting and raising a portion of the cylinder portion or the half-cylinder portion, for electrically connecting to the heating member, wherein the pipe member is arranged so that the cylinder portion or the half-cylinder portion is not to be exposed inside the flow channel of the pipe member.

7. A fluid pipe device according to claim 6, wherein the second heat transfer member includes another terminal member connected to the heating member.

* * * * *